(12) United States Patent
Yun et al.

(10) Patent No.: US 8,917,314 B2
(45) Date of Patent: Dec. 23, 2014

(54) APPARATUS AND METHOD FOR SYNCHRONIZING STEREOSCOPIC IMAGE, AND APPARATUS AND METHOD FOR PROVIDING STEREOSCOPIC IMAGE BASED ON THE SAME

(75) Inventors: Kugjin Yun, Daejon (KR); Bongho Lee, Daejon (KR); Hyun Lee, Daejon (KR); Gwangsoon Lee, Daejon (KR); Namho Hur, Daejon (KR); Jinwoong Kim, Daejon (KR); Soo-In Lee, Daejon (KR); Sung-Hoon Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 465 days.

(21) Appl. No.: 13/127,670

(22) PCT Filed: Jul. 21, 2009

(86) PCT No.: PCT/KR2009/004044
§ 371 (c)(1),
(2), (4) Date: May 26, 2011

(87) PCT Pub. No.: WO2010/053246
PCT Pub. Date: May 14, 2010

(65) Prior Publication Data
US 2011/0254920 A1    Oct. 20, 2011

(30) Foreign Application Priority Data
Nov. 4, 2008   (KR) .................. 10-2008-0108893

(51) Int. Cl.
*H04N 13/00* (2006.01)
*H04N 19/597* (2014.01)
(Continued)

(52) U.S. Cl.
CPC ..... *H04N 13/0048* (2013.01); *H04N 19/00769* (2013.01); *H04N 21/00* (2013.01);
(Continued)

(58) Field of Classification Search
CPC .......... H04N 13/0048; H04N 13/0051; H04N 13/0055; H04N 13/0059; H04N 13/0066; H04N 19/00769; H04N 21/00; H04N 21/65; H04N 21/238; H04N 21/434; H04N 21/438; H04N 21/23; H04N 21/231; H04N 29/08801; H04N 21/23106; H04N 21/232; H04N 21/80
See application file for complete search history.

(56) References Cited

U.S. PATENT DOCUMENTS 4,562,463 A * 12/1985 Lipton ........................... 348/56
5,953,054 A    9/1999 Mercier
(Continued)

FOREIGN PATENT DOCUMENTS

EP    1093302 A2    4/2001
JP    2001-186437    7/2001
(Continued)

OTHER PUBLICATIONS

Park, Kyung-Suek et al., "A Viewpoint Switching Method for Multiview Videos USing the MPEG-4 System," Sixth International Conference on Advanced Language Processing and Web Information Technology, pp. 287-292 (2007).

*Primary Examiner* — Sath V Perungavoor
*Assistant Examiner* — Jill Sechser
(74) *Attorney, Agent, or Firm* — Nelson Mullins Riley & Scarborough LLP; Anthony A. Laurentano, Esq.; Lewis Lee, Esq.

(57) ABSTRACT

An apparatus and a method for synchronizing and providing a stereoscopic image are provided. The method includes storing a first image, receiving a second image that forms a stereoscopic image with the first image correlated, synchronizing the first image and the second image, and outputting the synchronized two images.

12 Claims, 5 Drawing Sheets

(51) Int. Cl.

| | | |
|---|---|---|
| *H04N 21/00* | (2011.01) | |
| *H04N 21/65* | (2011.01) | |
| *H04N 21/238* | (2011.01) | |
| *H04N 21/434* | (2011.01) | |
| *H04N 21/23* | (2011.01) | |
| *H04N 21/438* | (2011.01) | |
| *H04N 21/231* | (2011.01) | |
| *H04L 29/08* | (2006.01) | |
| *H04N 21/232* | (2011.01) | |

(52) U.S. Cl.
CPC ............ *H04N 21/65* (2013.01); *H04N 21/238* (2013.01); *H04N 21/434* (2013.01); *H04N 21/23* (2013.01); *H04N 21/438* (2013.01); *H04N 21/23106* (2013.01); *H04N 21/231* (2013.01); *H04L 29/08801* (2013.01); *H04N 21/232* (2013.01); *H04N 13/0051* (2013.01); *H04N 13/0055* (2013.01); *H04N 13/0059* (2013.01); *H04N 13/0066* (2013.01)
USPC .......................................................... 348/43

(56) References Cited

U.S. PATENT DOCUMENTS

| | | | |
|---|---|---|---|
| 6,784,917 B1 * | 8/2004 | Yamamoto et al. | 348/43 |
| 7,039,070 B2 * | 5/2006 | Kawakatsu | 370/503 |
| 7,650,036 B2 * | 1/2010 | Lei et al. | 382/232 |
| 2005/0244050 A1 * | 11/2005 | Nomura et al. | 382/154 |
| 2006/0221178 A1 * | 10/2006 | Yun et al. | 348/42 |
| 2007/0133943 A1 * | 6/2007 | Muguruma et al. | 386/83 |
| 2008/0152016 A1 * | 6/2008 | Nagahara et al. | 375/240.26 |
| 2010/0110162 A1 | 5/2010 | Yun et al. | |
| 2010/0325676 A1 | 12/2010 | Kim et al. | |

FOREIGN PATENT DOCUMENTS

| | | |
|---|---|---|
| JP | 2004-40455 | 2/2004 |
| JP | 2006-121601 | 5/2006 |
| KR | 10-2008-0030360 A | 4/2008 |
| KR | 10-2008-0053175 A | 6/2008 |
| WO | 2008/069613 A1 | 6/2008 |

* cited by examiner

APPARATUS AND METHOD FOR SYNCHRONIZING STEREOSCOPIC IMAGE, AND APPARATUS AND METHOD FOR PROVIDING STEREOSCOPIC IMAGE BASED ON THE SAME

RELATED APPLICATIONS

This application is a 35 U.S.C. §371 national stage filing of PCT Application No. PCT/KR2009/004044 filed on Jul. 21, 2009, which claims priority to, and the benefit of, Korean Patent Application No. 10-2008-0108893 filed Nov. 4, 2008. The contents of the aforementioned applications are hereby incorporated by reference.

TECHNICAL FIELD

The present invention relates to a technology for synchronizing and providing an image; and, more particularly, to an apparatus and a method for synchronizing and providing a stereoscopic image.

BACKGROUND ART

The standardization of a technology of providing stereoscopic contents has been in progress. Such standardization induces the related technologies to be rapidly advanced based on various digital image devices such as a digital television (TV), a mobile phone, a digital camera, a digital versatile disk (DVD), and a portable multimedia player (PMP). The stereoscopic contents provide natural images with superior three-dimensional (3D) effect and excellent reality. Accordingly, technologies for capturing, generating, and displaying the stereoscopic contents have been developed, and relevant technologies for application services and devices using the stereoscopic contents have been also advanced as well.

As a related art, a side-by-side method was introduced for forming a stereoscopic image. The side-by-side method provides a stereoscopic service by reducing left and right images of stereoscopic contents by half and including the reduced left and right images in one frame.

For example, the left image is reduced by half by collecting only odd number vertical lines in the left image, and the right image is reduced by half by collecting only even number vertical lines in the right image, and the reduced left and right images are include in one frame. Since both of the left and right images are included in one frame, it is easy to synchronize the left image with the right image. However, the side-by-side method has disadvantages as well. That is, the image resolution is deteriorated and it is not comparable with typical digital broadcasting.

A frame sequential method was introduced as another method for forming a stereoscopic image according to the related art. The frame sequential method according to the related art encodes a right image and a left image of stereoscopic contents alternatively. The frame sequential method according to the related art advantageously provides a stereoscopic image having a full resolution that is identical to an original image.

However, the frame sequential method may disadvantageously cause a difficulty of synchronizing a left image with a right image and may provide a related service with one of the right and left images ignored if one of the right and left images is broken. Therefore, the frame sequential method according to the related art is not comparable with typical digital broadcasting.

Furthermore, an encoding method according the related art was introduced for providing stereoscopic contents while sustaining comparability with typical digital broadcasting. This encoding method encodes left and right images using different CODECs such as MPEG-2(Moving Picture Expert Group-2) and Advanced Video Coding (AVC).

Moreover, another encoding method was introduced for providing stereoscopic image with the comparability sustained. This encoding method encodes left and right images using relation between the left and right images.

Although these methods sustain the comparability with the typical digital broadcasting system, these methods require additional CODECs for individually coding and decoding the left and right images, thereby having high system complexity. Also, it is difficult to apply these methods to HD level high resolution digital broadcasting services due to limitation of a digital broadcasting bandwidth.

DISCLOSURE OF INVENTION

Technical Problem

An embodiment of the present invention is directed to providing a technology for effectively synchronizing and providing stereoscopic images.

Another embodiment of the present invention is directed to providing a high quality stereoscopic digital broadcasting service within a limited frequency bandwidth of digital broadcasting while sustaining comparability with typical digital broadcasting.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for providing a stereoscopic image including storing a first image, receiving a second image that forms a stereoscopic image with the first image correlated, synchronizing the first image and the second image, and outputting the synchronized two images.

In accordance with an aspect of the present invention, there is provided an apparatus for providing a stereoscopic image including a memory for storing a first image, a receiver for receiving a second image that forms a stereoscopic image with the first image correlated, a synchronization controller for synchronizing the first image and the second image, and an output unit for outputting the synchronized two images.

In accordance with an aspect of the present invention, there is provided a method for synchronizing a stereoscopic image including storing a first image, receiving a second image that forms a stereoscopic with the first image correlated, and synchronizing the first image and the second image.

In accordance with an aspect of the present invention, there is provided an apparatus for synchronizing a stereoscopic image including a memory for storing a first image, a receiver for receiving a second image that forms a stereoscopic image with the first image correlated, and a synchronization controller for synchronizing the first image and the second image.

Advantageous Effects

According to the present invention, stereoscopic images can be effectively synchronized and provided. Particularly, a

BEST MODE FOR CARRYING OUT THE INVENTION

The advantages, features and aspects of the invention will become apparent from the following description of the embodiments with reference to the accompanying drawings, which is set forth hereinafter. In order to provide a stereoscopic image, it is necessary to have two images, a left image and a right image. Hereinafter, the first image and the second images mean one of the left image and the right image.

Figure 1:
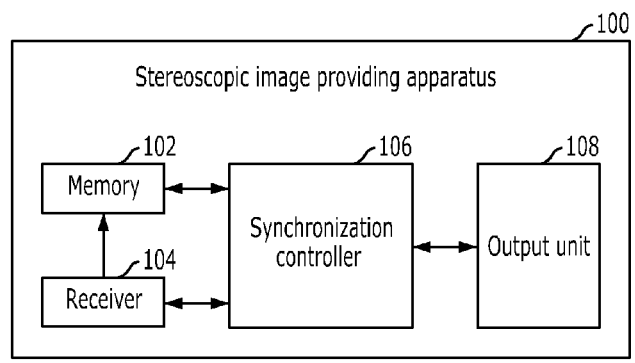
FIG. 1 illustrates a stereoscopic image providing apparatus 100 in accordance with an embodiment of the present invention.

FIG. 1 illustrates a stereoscopic image providing apparatus 100 in accordance with an embodiment of the present invention. The stereoscopic image providing apparatus 100 may be embodied as a terminal or a set-top for 3D broadcasting service.

As shown in FIG. 1, the stereoscopic image providing apparatus 100 includes a memory 102, a receiver 104, a synchronization controller 106, and an output unit 108.

The memory 102 stores a first image and the receiver 104 receives a second image corresponding to the first image. The second image is an image that forms a stereoscopic image with the first image correlated. If the first image is a right image, the second image is the left image.

Also, if the first image and the second image are independently reproduced, the first image and the second image can be displayed in 2D images. The first image may be an image that is received from the outside or received in advance through a broadcasting signal. The synchronization controller 106 synchronizes the previously stored first image with the second image received by the receiver 104. The output unit 108 outputs the synchronized two images as a stereoscopic image.

The stereoscopic image providing apparatus 100 according to the present embodiment stores one of the two images of the stereoscopic image in advance and additionally receives the other image as described above. Therefore, the stereoscopic image providing apparatus 100 according to the present embodiment effectively uses a transmit bandwidth for receiving images.

For example, if at least one of the first and second images is a digital broadcasting program, the memory 102 stores the first image before a time of broadcasting the digital broadcasting program. Here, the first image may be received by the receiver 104. Or the first image may be stored in an external device after received through a broadcasting channel, Internet, and satellite communication and inputted to the stereoscopic image providing apparatus later.

A stereoscopic image provider may provide a service that enables a viewer to receive the first image in advance by selecting desired stereoscopic broadcasting after providing a broadcasting program list to the viewer. The receiver 104 receives the second image at a time of broadcasting the digital broadcasting program. Then, the synchronization controller 106 synchronizes the first and second images and the output unit 108 outputs the synchronized images.

Therefore, the stereoscopic image providing apparatus 100 according to the present embodiment can provide high definition stereoscopic digital broadcasting contents to a viewer in real time while sustaining comparability with a typical digital broadcasting system. In this case, the stereoscopic image providing apparatus 100 according to the present embodiment can provide a stereoscopic image with full resolution without having the transmit bandwidth limitation problem which has been arisen when HD level stereoscopic digital broadcasting was provided.

Figure 2:
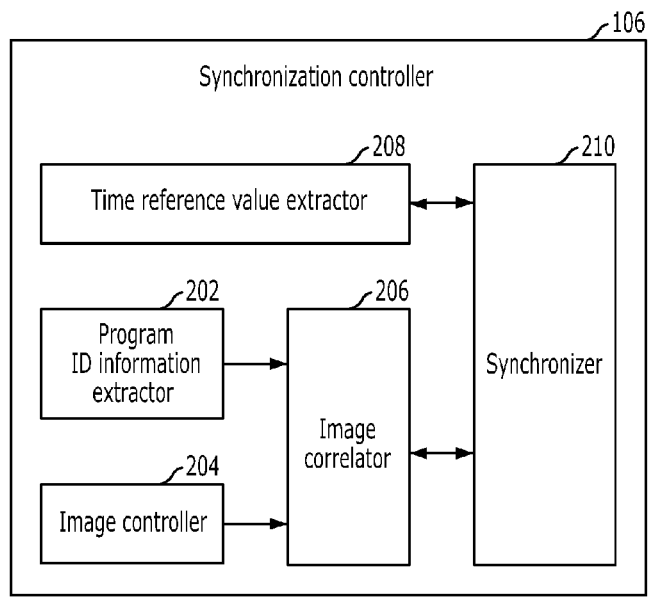
FIG. 2 illustrates a synchronization controller 106 shown in FIG. 1.

FIG. 2 is a synchronization controller 106 shown in FIG. 1. As shown in FIG. 1, the synchronization controller 106 includes a program ID information extractor 202, an image controller 204, and an image correlator 206. The synchronization controller 106 may further include a time reference value extractor 208 and a synchronizer 210.

The program ID information extractor 202 extracts program ID information from a first image. The program ID information is a unique index of the first image, which is assigned to the first image. The image controller 204 determines whether a stereoscopic image is formed from a second image or not.

If the image controller 204 determines that the stereoscopic image is formed from the second image, the image correlator 206 correlates the first image with the second image using the extracted program ID information from the program ID information extractor 202. Since the second image can be displayed in a two dimensional image independently, the image controller 204 decides an image output method based on information about whether a stereoscopic image is formed or not.

If the image controller 204 determines that the stereoscopic image is formed, the image controller 204 finds a first image corresponding to the second image and synchronizes the first image with the second image. Since the first image is stored in the stereoscopic image providing apparatus 100 in advance, the stereoscopic image providing apparatus 100 may store one of left images and right images for various broadcasting programs.

Although the stereoscopic image providing apparatus 100 stores a plurality of first images in advance, there is only one first image corresponding to a second image. The image correlator 206 can find the first image that is related to the second image using the program identification information extracted from the first image.

The time reference value extractor 208 extracts time reference values from the first image and the second image. The synchronizer 210 synchronizes the first image and the second image using the time reference values extracted by the time reference value extractor 208. The synchronizer 210 can confirm two corresponding images using correlation information of the first and second images from the image correlator 206. The synchronizer 210 may synchronize two images by correcting one of the extracted time reference values of the first and second images to be identical to the other.

The time reference values of the first and second images may be different because a time of receiving the second image is different from a time of receiving and storing the first image. The synchronizer 210 may synchronize two images by correcting a time stamp of the first image or the second image using the extracted time reference values.

Also, the synchronizer 210 counts packets or frames of the second image according to the extracted time reference values and corrects count numbers of packets or frames of the first image to be identical to count number of packets of the second image.

Figure 3:
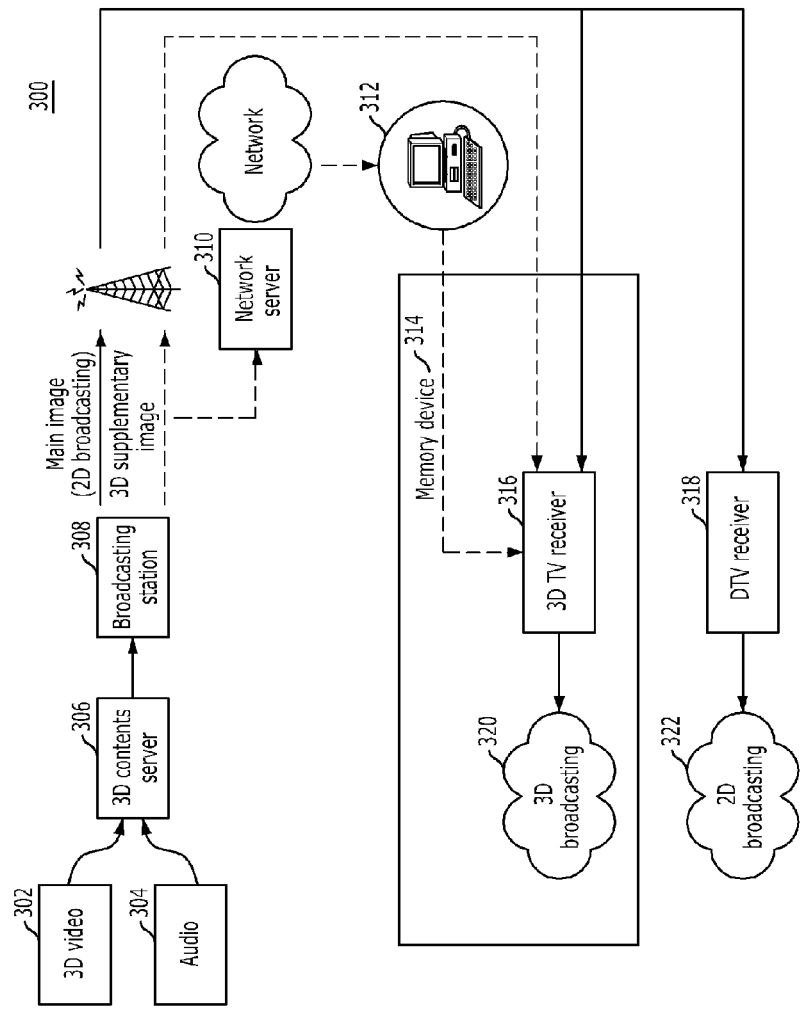
FIG. 3 illustrates a digital broadcasting system 300 in accordance with an embodiment of the present invention.
Figure 4:
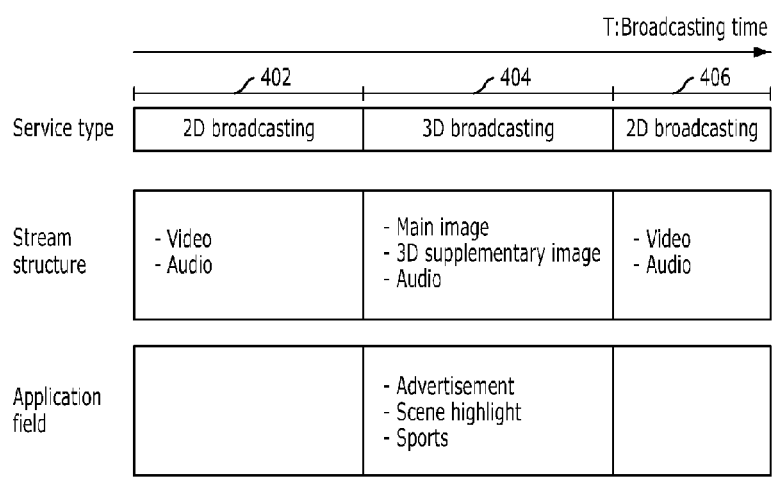
FIG. 4 is a diagram illustrating a 3-D broadcasting program in accordance with an embodiment of the present invention.

FIG. 3 is a diagram illustrating a digital broadcasting service system 300 in accordance with an embodiment of the present invention. FIG. 4 is a diagram illustrating a 3D broadcasting program in accordance with an embodiment of the present invention. The digital broadcasting service system 300 according to the present embodiment provides a broadcasting program including 3D broadcasting programs to viewers. A left image and a right image may be independently reproduced in a two dimensional image.

Also, one of the left and right images may be reproduced as a stereoscopic image with the other. Each of the left and right images may be formed in a stream independently or dependently to the other. Here, the independent stream means a stream that can be reproduced in a 2D image in order to sustain comparability with typical broadcasting. The dependent stream means a stream that can be reproduced as an independent stream. Accordingly, the first image, which is transmitted and stored before a time of broadcasting a related broadcasting program, is referred as a 3D supplementary image, and the second image, which is transmitted at a time of broadcasting a related broadcasting program, is referred as a main image.

At first, a 3D contents server 306 transfers stereoscopic contents including a 3D video 302 and audio 304 to a broadcasting station 308. The broadcasting station 308 divides the 3D video into a main image and a 3D supplementary image and separately transmits the main image and 3D supplementary image. A network server 310 receives the 3D supplementary image in advance and transmits the received 3D supplementary image to a computer 312 or a 3D TV receiver 316 before the main image is broadcasted.

Here, the 3D supplementary image can be transmitted through the Internet and a viewer transfers the received 3D supplementary image to a 3D TV receiver 316 through a memory device 314. If the 3D TV receiver 316 has a capability of receiving a 3D supplementary image, the computer 312 and the memory device 314 are not necessary. That is, the 3D TV receiver 316 can directly receive and store the 3D supplementary image. When the broadcasting station 308 broadcasts a main image, the 3D TV receiver 316 receives the main image, synchronizes the received main image with the stored 3D supplementary image, and outputs the synchronized image as a 3D broadcasting 320. A viewer having a typical DTV receiver 318 can watch 2D broadcasting 322 including the main image only through the DTV receiver 318.

The 3D broadcasting program can be serviced as shown in FIG. 4. During a period 402, a broadcasting program is provided in a 2D broadcasting service type. During a predetermined period 404, a broadcasting program is provided in a 3D broadcasting service type. After providing the 3D broadcasting program, a 2D broadcasting program is provided again in a period 406. The 2D broadcasting is formed of video and audio streams and the 3D broadcasting is formed of main image, 3D supplementary image, and audio streams. The period 404 for providing the 3D broadcasting program may differ according to a memory space of the 3D TV receiver for storing 3D supplementary image. For example, 3D broadcasting programs may be advertisements, scene highlights, and sport events. The advertisements and the scene highlights are reproduced in comparatively short time. If these are broadcasted in 3D, the effect thereof may be significant. Also, if the sport event is broadcasted in 3D, it may give richer presence and excellent solidity. Also, various related information can be displayed with the 3D images. Therefore, the sport events can be effectively broadcasted.

In the present embodiment, the 3D supplementary image is a stream that is encoded using a typical commercial video CODEC and multiplexed based on MPEG-2 standard. The 3D supplementary image is stored as a MPEG-2 Transport Stream (ST). However, the 3D supplementary image may be stored in other formats including a MPEG-2 TS. The 3D supplementary image may also be stored in an additional storage file format or a transport protocol as an encoded stream. The transport stream TS may include program specific information (PSI) which is MPEG-2 program control information or include only a media stream, for example, a 3D supplementary image stream, without program control information (PSI).

Although the transport stream (TS) includes the program specific information (PSI), the 3D TV receiver 315 may use the program specific information (PSI) of a main image and ignore the program specific information (PSI) of the 3D supplementary image in order to synchronize the 3D supplementary image with the main image stream that is broadcasted in real time. It is possible to reduce the complexity of the 3D TV receiver 316 by storing the 3D supplementary image in a format similar to a transport stream of a main image.

The 3D TV receiver 316 may be embodied to match a time stamp of a storage file format with a time stamp of a main image stream in order to synchronize the storage file format with the main image stream that is broadcasted in real time when the 3D supplementary image is stored in the storage file format. In this case, it is possible to advantageously reduce the overhead of a system for storing the 3D supplementary image in a format of a transport stream (TS).

Figure 5:
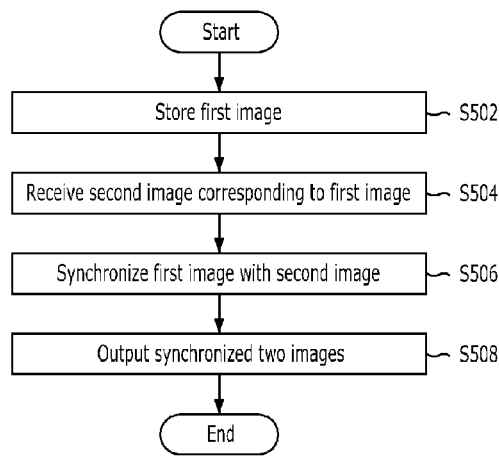
FIG. 5 is a flowchart describing a method for providing a stereoscopic image in accordance with an embodiment of the present invention.

FIG. 5 is a flowchart describing a method for providing a stereoscopic image in accordance with an embodiment of the present invention.

A second image is received at step S504 after a first image is stored at step S502. A stereoscopic image may be formed by correlating the first image with the second image. Then, the received second image is synchronized with the stored first image at step S506. After synchronizing, the synchronized two images are outputted as the stereoscopic image at step S508. As described above, the first and second images may be individually displayed as a 2D image or only the second image may be displayed in a 2D image.

If at least one of the first and second images is a digital broadcasting program, the first image may be stored before the digital broadcasting program is broadcasted and the second image may be received at a time of broadcasting the digital broadcasting program. For example, if the second image is a digital broadcasting program, the first image may be a 3D supplementary image which belongs to the digital broadcasting program and forms a stereoscopic image with the second image. The second image is a main image as a typical 2D image that forms the digital broadcasting program. The 2D image may be displayed with the first image with the stereoscopic image or individually displayed in a 2D image.

Figure 6:
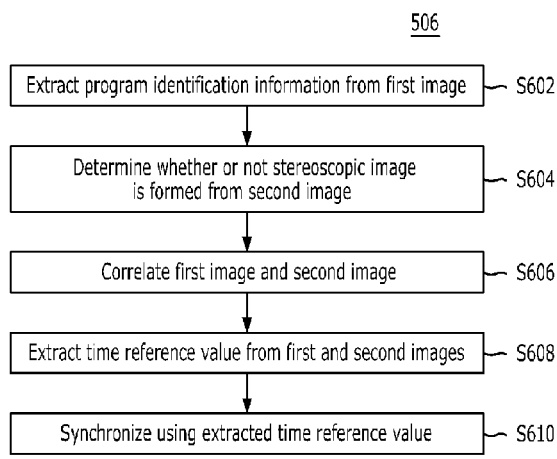
FIG. 6 is a flowchart illustrating a synchronization step S506 shown in FIG. 5.

FIG. 6 is a flowchart for illustrating synchronizing a first image with a second image at step S506 in detail.

The synchronizing the first image with the second image includes extracting program identification information from the first image at step S602 and determining whether a stereoscopic image from the second image at step S604. If it is determined that the stereoscopic image is formed from the second image at step S604, the first image is correlated with the second image at step S606. At the step S606, the first image may be correlated with the second image by searching the first image using the program identification information extracted from the step S602.

At the step S610, one of the time reference values extracted from the first and second images is corrected to be matched with the others or a time stamp of the first image or the second image may be corrected using the extracted time reference values. At the step S610, packets/frames of the second image are counted based on a time reference value and count numbers of packets/frames of the first image may be corrected to be matched with the counter numbers of the packets/frames of the second image. Here, the time reference value may be a program clock reference (PCR) and the time stamp may be one of a decoding time stamp (DTS) and a presentation time stamp (PTS).

Figure 7:
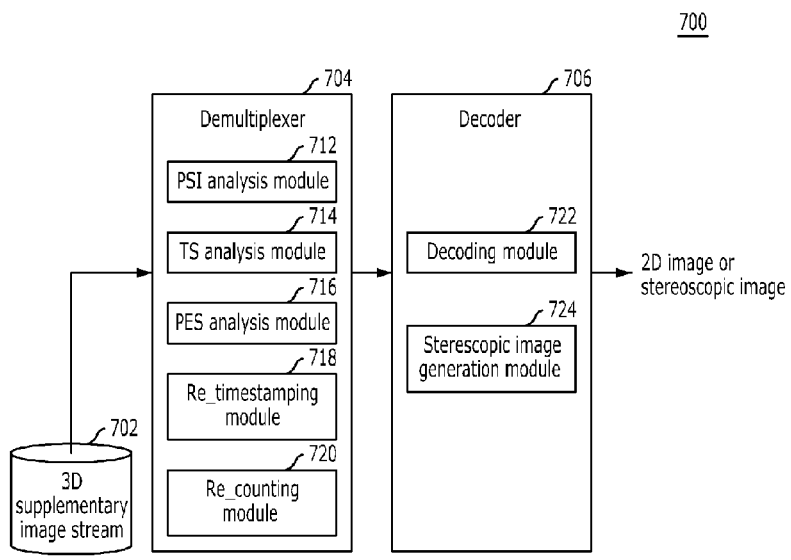
FIG. 7 illustrates a stereoscopic image providing apparatus 700 in accordance with an embodiment of the present invention.

FIG. 7 is a diagram illustrating a stereoscopic image providing apparatus 700 in accordance with an embodiment of the present invention.

As shown in FIG. 7 the stereoscopic image providing apparatus 700 according to the present embodiment includes a demultiplexer 704 and a decoder 706. The demultiplexer 704 includes a PSI analysis module 712, a TS analysis module 714, a PES analysis module 716, a Re_timestamping module 718, and a Re_counting module 720. The decoder 706 includes a decoding module 722 and a stereoscopic image generation module 724. Hereinafter, a main image is a second image that a stereoscopic image providing apparatus 700 receives, and a 3D supplementary image is a first image that is stored in the stereoscopic image providing apparatus 700 in advance.

When a 3D supplementary image stream 702 is inputted to the demultiplexer 704, the PSI analysis module 712 extracts program specific information (PSI). The TS analysis module 714 extracts a PCR, which is a time reference value included in a header of a transport stream (TS), and a program ID (PID). The PES analysis module 716 analyzes a packet counter or a PES private data include in a header of a packetized elementary stream (PES). The demultiplexer 704 may count packets or frames of a 3D supplementary image using the analyzed packet counter or PES private data. The Re_timestamping module 718 corrects a time stamp of the 3D supplementary image stream according to the extracted PCR, DTS, and PTS, that is, a time reference value or a time stamp.

If the 3D supplementary image stream 702 is stored in a predetermined storage file format, not a format of a transport stream (TS), the Re_timestamping module 718 corrects a time stamp of the storage file format based on the extracted time reference value. The Re_counting module 720 corrects the counter numbers of the main image stream and the supplementary image stream according to the PCR to be matched with each others. The Re_timestamping module 718 may be included in the TS analysis module 714 and the Re_counting module 720 may be include in the PES analysis module 716.

The decoder 706 decodes only the main image and the 3D supplementary image streams having the same time stamp through the decoding module 722 and outputs the decoded main image and 3D supplementary image as a stereoscopic image through the stereoscopic image generation module 724. In case of reproducing a conventional 2D broadcasting, the stereoscopic image generation module 724 is not used.

Figure 8:
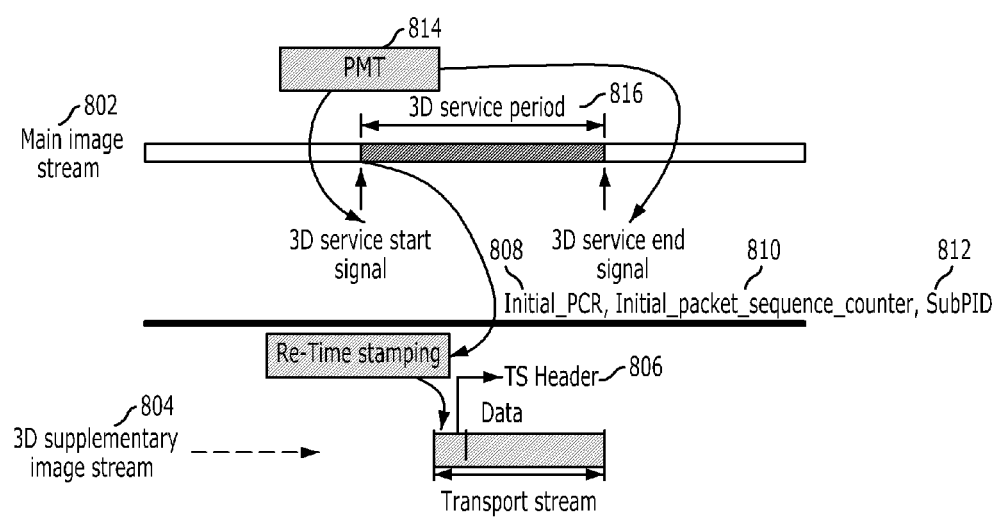
FIG. 8 illustrates a stereoscopic image stream in accordance with an embodiment of the present invention.

FIG. 8 is a diagram illustrating a stereoscopic image stream in accordance with an embodiment of the present invention. Hereinafter, a method of synchronizing a main image with a 3D supplementary image will be described with reference to FIG. 8.

The stereoscopic image providing apparatus generally uses a PCR, which is used in a typical digital broadcasting for audio and video (AV) synchronization, to synchronize a main image with a 3D supplementary image. The PCR is a time reference value for matching a decoding time and a reproducing time. The PCR is transmitted through a header 806 of a MPEG-2 TS. It is essential to synchronize a main image with a 3D supplementary image in order to reproduce stereoscopic contents.

However, two images have different time values because the 3D supplementary image is transmitted and stored before the main image is transmitted and stored. Therefore, the time values of the 3D supplementary image and the main image are The stereoscopic image providing apparatus synchronizes a main image stream 802 with the 3D supplementary image stream 804 using a PCR at a time of starting a 3D broadcasting in the main image stream 802. That is, a time stamp of the 3D supplementary image stream 804 is re-time stamped based on the PCR value of the main image stream 802 as a reference. The time stamp may be a DTS or PTS of each packet. For example, it is assumed that a PCR value of a start TS packet of the 3D supplementary image stream 804 is 1000 and a start PCR value of a main image stream 802 when a 3D broadcasting begins is 2000. In this case, the PCT value of the start TS packet of the 3D supplementary image stream 804 is corrected to 2000 as much as a difference of two PCR values which is 1000.

Also, DTS and PTS values of following consecutive packets are corrected based on the corrected PCR value. If the time stamp is corrected, the two image streams 802 and 804 are synchronized through the PTS and reproduced as a stereoscopic image. Since a viewer may receive a service by turning on a TV in a 3D broadcasting service period 816, the main image stream 802 necessarily includes a time of starting 3D broadcasting and a corresponding PCR value even in a 3D broadcasting service period 816. In this case, the stereoscopic image providing apparatus can be aware of a 3D broadcasting starting time of the main image stream 802 and a corresponding PCR value. Therefore, it is possible to synchronize the main image stream with the 3D supplementary image stream 804.

In order to precisely synchronize, a program_packet sequence_counter field or a PES Private data field in a PES header may be used. It is equivalent to continuously count consecutive PES packets. At a time of starting a 3D broadcasting, a program_packet sequence_counter_flag of a PES header becomes 1 and PES packets of the main image stream 802 are counted through program_packet sequence_counter. The count numbers of PES packets that form the 3D supplementary image stream 804 are corrected to be identical to a first PES packet count number of the main image stream 802 at a time of beginning 3D broadcasting.

For example, if the PES packet count number of the main image stream is 100, the first PES packet count number of the 3D supplementary image stream 804 is corrected to 100.

Also, numbers may be allocated to each packet or frame using a PES Private data field. With the above described method, the PES packet numbers or the PES frame numbers of the 3D supplementary image stream 804 can be corrected to be identical to the PES packet number or the PES frame number of the main image stream 802 at a time of beginning the 3D broadcasting.

The Program Map Table (PMT) 814 may include necessary information for performing the synchronization process. That is, the PMT 814 may include initial_PCR 808 as a PCR value of a 3D broadcasting beginning part for synchronization, initial_packet sequence_counter 810 as a packet count number at 3D broadcasting beginning part, and SubPID 812 as a program identification information. The PMT 814 will be described in more detail with reference to FIG. 9, hereinafter.

Figure 9:
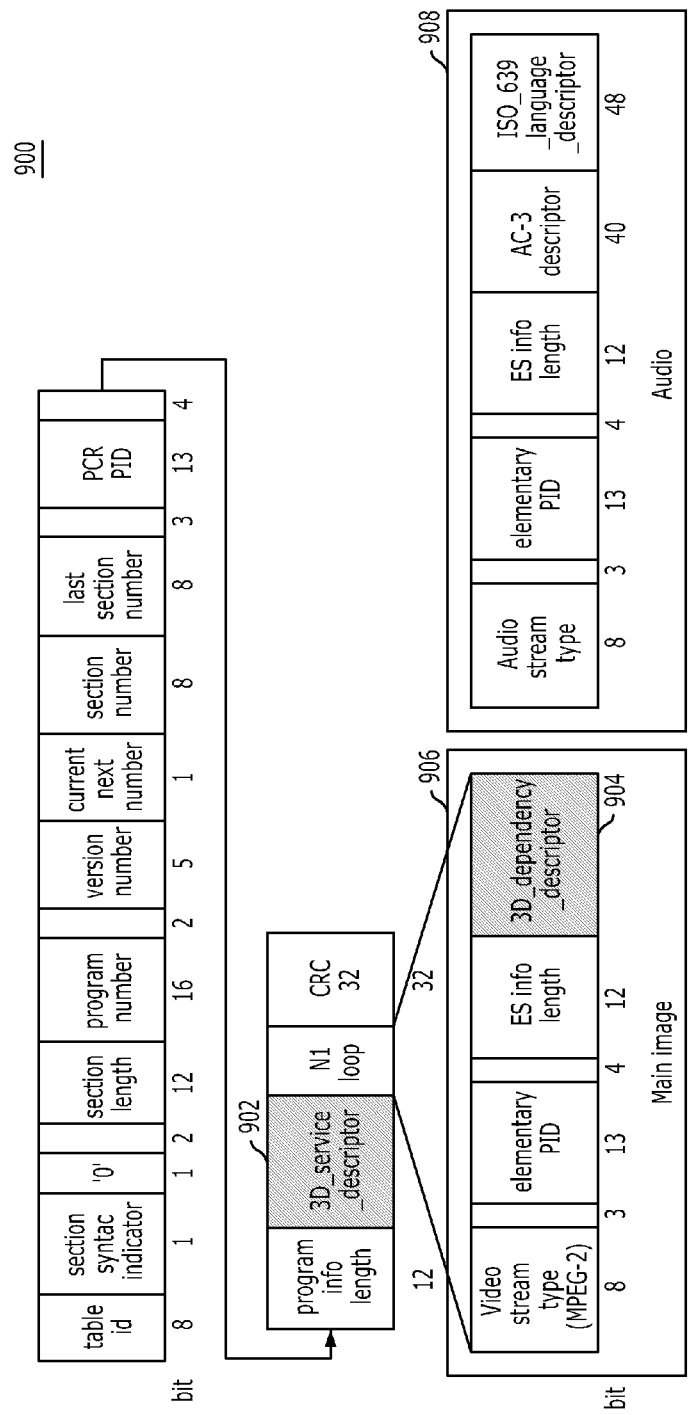
FIG. 9 illustrates a program map table showing broadcasting program information in accordance with an embodiment of the present invention.

FIG. 9 is a diagram illustrating a PMT 900 including broadcasting program information in accordance with an embodiment of the present invention.

The PMT 900 expresses basic information about digital broadcasting programs on a MPEG-2 system. As a descriptor, the PMT 900 defines a 3D service_descriptor 902 and a 3D_dependency_descriptor 904. The 3D service_descriptor 902 includes information on whether 2D/3D broadcasting is broadcasted or not, information on correlation between a main image and 3D supplementary images, and an initial PCR. That is, the 3D service_descriptor 902 includes information on a 2D broadcasting period and a 3D broadcasting period of a broadcasting program. Since additionally required descriptors for overall broadcasting program may be added after the program_info_length, the 3D service_descriptor 902 is arranged after the program_info_length.

As shown in FIG. 9, an N1 loop is divided into a bitstream having information on a main image 906 and another bitstream having information on an audio 908. The 3D_dependency_descriptor 904 includes information on correlation between the main image and the 3D supplementary images. Since additional information related to the main image of the broadcasting program may be added after the ES_info_length, the 3D_dependency_descriptor 904 is arranged after the ES_info_length. However, it is not limited that the 3D service_descriptor 902 and the 3D_dependency_descriptor 904 are included in the PMT 900.

These descriptors may be included in various tables applied to the other broadcasting service as an independent descriptor. Also, the names of the 3D service_descriptor 902 and the 3D_dependency_descriptor 904 and locations thereof in the PMT 900 may differ according to embodiments. Further, fields of these descriptors may be included in other descriptors or embodied as independent descriptors.

Table 1 shows a 3D service_descriptor according to an embodiment of the present invention. The 3D service_descriptor includes information on whether a 2D broadcasting program or a 3D broadcasting program is broadcasted and initial PCR information.

TABLE 1

| Syntax | No. of Bits |
|---|---|
| 3D_service_descriptor ( ) { | |
|   descriptor_tag | 8 |
|   descriptor_length | 8 |
|   3DService_flag | 1 |
|   if (3Dservice_flag) { | |
|     initial_PCR | 42 |
|     3D_auxiliary_dataType | 3 |
|     Reserved | 2 |
|   } | |
|   Reserved | 7 |
| } | |

In Table 1, the 3DService_flag is a value for indicating whether a 2D broadcasting or a 3D broadcasting is broadcasted or not. The 3DService_flag may be defined to indicate the 2D broadcasting if the 3DService_flag is '0' or to indicate the 3D broadcasting if the 3DService_flag is '1'. The initial_PCR indicates an initial PCR value which is a time reference value of a 3D broadcasting beginning time.

Table 2 shows a 3D service_descriptor according to another embodiment of the present invention.

TABLE 2

| Syntax | Number of Bits |
|---|---|
| 3D_service_descriptor ( ) { | |
|   descriptor_tag | 8 |
|   descriptor_length | 8 |
|   3DService_flag | 1 |
|   if (3Dservice_flag) { | |
|     initial_PCR | 42 |
|     initial_packet_sequence_counter | 7 |
|     3D_auxiliary_dataType | 3 |
|     Reserved | 3 |
|   } | |
|   Reserved | 7 |
| } | |

The initial_packet sequence_coiunter denotes a counter number of a PES packet at a time of beginning 3D broadcasting or a count number of a frame allocated to a PES Private data field.

The 3D auxiliary_dataType denotes an image forming type of a 3D supplementary image stream stored in a stereoscopic image providing apparatus. There are many methods for displaying synchronized left images and right images as a stereoscopic image, for example, a polarization method for displaying a left image and a right image in overlap, a frame sequential method for alternatively and repeatedly reproducing frames of a left image and a right image, a field sequential method for alternatively and repeatedly reproducing field images of a left image and a right image, and a method of reproducing left and right images by interleaving odd lines of a left image and even lines of a right image by a unit of line, and a method of reproducing left and right images by interleaving odd columns of a left image and even columns of a right image by a unit of pixel. Since the 3D supplementary image is used only for reproducing stereoscopic contents, it is required to have size information of an image. This is because the polarization method or the frame sequential method needs an image having the same size of a main image and other methods need an image having a half size of the main image in a horizontal direction or a vertical direction.

Table 3 shows 3D auxiliary_dataType. The 3D_auxiliary dataType includes information on a size of a 3D supplementary image and metadata of a depth map or a disparity map. The depth map and the disparity map are used to display the left and right image as a stereoscopic image.

TABLE 3

| Value | Type |
|---|---|
| 000 | Reserved |
| 001 | Same size image compared to main image |
| 010 | Horizontal half size image compared to main image |
| 011 | Vertical half size image compared to main image |
| 100 | Horizontal/vertical size image compared to main image |
| 101 | Depth map |
| 1110 | Disparity map |
| 101~111 | Reserved |

Table 4 shows a structure of the 3D_dependency_descriptor 904.

TABLE 4

| Syntax | No. of Bits |
|---|---|
| 3D_dependency_descriptor ( ) { | |
| descriptor_tag | 8 |
| descriptor_length | 8 |
| SubPID | 13 |
| 3D_auxiliaryData_streamtype | 8 |
| Reserved | 3 |
| } | |

The 3D_dependency_descriptor 904 is used for 3D broadcasting and includes correlation information of the main image and the 3D supplementary image. SubPID denotes a PID of a 3D supplementary image stream related to a main image stream for reproducing a stereoscopic image. Also, SubPID may denote a predetermined index of a 3D supplementary image related to a main image stream. 3D_auxiliaryData_streamtype denotes a stream type of a 3D supplementary image stored in a stereoscopic image providing apparatus, for example, a MPEG-2 stream or an AVC stream.

However, the present invention is not limited to the described embodiments. The present invention may be changed or modified to various other embodiments. For example, the present invention can be easily applied for a multichannel audio service as well as the high definition stereoscopic service. In case of a 20.1 channel service, a stereoscopic image providing apparatus according to the present invention may be embodied to receive 15 channels in advance and receive 5.1 channels at a time of broadcasting a main broadcasting program. Then, the stereoscopic image providing apparatus according to the present invention provides the 20.1 channel service by integrating the previously received 15 channels with the 5.1 channels.

In the specification, a module means a unit such as a function or a device that performs a predetermined process. The module can be embodied as hardware, software, or the combination thereof.

The described apparatus and systems can be embodied as hardware, software, or the combination thereof. In hardware, a module for synchronizing stereoscopic image may be embodied as at least one of an application specific integrated circuit (ASIC), a digital signal processor (DSP), a digital signal processing device (DSPD), a programmable logic device (PLD), a field programmable gate array (FPGA), a processor, a controller, a micro controller, a microprocessor, and an electric unit designed to perform the described functions, or the combination thereof. Software can be embodied through a module that performs the described functions. Software codes may be stored in memory units and executed by a processor. The memory unit may be embodied inside or outside a processor. In this case, the memory unit may be connected to the processor through various known methods.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2008-0108893, filed in the Korean Intellectual Property Office on Nov. 4, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A method for providing a stereoscopic image, comprising:
   storing a first image;
   receiving a second image that forms a stereoscopic image with the first image;
   synchronizing the stored first image and the received second image; and
   outputting the stereoscopic image generated by the synchronized images,
   wherein at least one of the first image and the second image is a digital broadcasting program,
   wherein the first image is stored before a time of broadcasting the digital broadcasting program, and
   wherein the second image is received at the time of broadcasting the digital broadcasting program according to a broadcasting schedule,
   wherein said synchronizing the stored first image and the receiving second image includes:
   extracting time reference values of the first image and the second image, and
   synchronizing the first image and the second image using the extracted time reference values,
   wherein in said synchronizing the first image and the second image using the extracted time reference values, at least one of time stamps of the first image and the second image is corrected according to the extracted time reference values.

2. The method of claim 1, wherein the first image and the second image are independently displayed as a 2D image.

3. The method of claim 1, wherein the said synchronizing the first image and the second image further includes:
   extracting program identification information from the first image;
   determining whether a stereoscopic image is formed from the second image or not; and
   correlating the first image and the second image based on the extracted program identification information if the stereoscopic image is determined to be formed from the second image.

4. The method of claim 1, wherein in said synchronizing the first image and the second image using the extracted time reference values,
   one of the extracted time reference values is corrected to be identical to the others.

5. The method of claim 1, wherein in said synchronizing the first image and the second image using the extracted time reference values,
   packets of the second image are counted according to the extracted time reference values, and count numbers of packets of the first image are corrected to be identical to count numbers of the packets of the second image.

6. An apparatus for providing a stereoscopic image, comprising:
   a memory for storing a first image;
   a receiver for receiving a second image that forms a stereoscopic image with the first image;

a synchronization controller for synchronizing the stored first image and the received second image; and
an output unit for outputting the stereoscopic image generated by the synchronized images,
wherein at least one of the first image and the second image is a digital broadcasting program,
wherein the memory stores the first image before a time of broadcasting the digital broadcasting program, and
wherein the receiver receives the second image at the time of broadcasting the digital broadcasting program according to a broadcasting schedule,
wherein the synchronization controller includes:
a time reference value extractor for extracting time reference values of the first image and the second image, and
a synchronizer for synchronizing the first image and the second image using the extracted time reference values,
wherein the synchronizer corrects at least one of time stamps of the first image and the second image according to the extracted time reference values.

7. The apparatus of claim 6, wherein the first image and the second image are independently displayed as a 2D image.

8. The apparatus of claim 6, wherein the synchronization controller further includes:
a program identification information extractor for extracting program identification information from the first image;
an image controller for determining whether a stereoscopic image is formed from the second image or not; and
an image correlator for correlating the first image and the second image based on the extracted program identification information if the stereoscopic image is determined to be formed from the second image.

9. The apparatus of claim 6, wherein the synchronizer corrects at least one of the extracted time reference values to be identical to the others.

10. The apparatus of claim 6, wherein the synchronizer counts packets of the second image according to the extracted time reference value and corrects count numbers of packets of the first image to be identical to count numbers of the packets of the second image.

11. A method for synchronizing a stereoscopic image, comprising:
storing a first image;
receiving a second image that forms a stereoscopic with the first image; and
synchronizing the stored first image and the received second image,
wherein at least one of the first image and the second image is a digital broadcasting program,
wherein the first image is stored before a time of broadcasting the digital broadcasting program, and
wherein the second image is received at the time of broadcasting the digital broadcasting program according to broadcasting schedule,
wherein said synchronizing the stored first image and the receiving second image includes:
extracting time reference values of the first image and the second image, and
synchronizing the first image and the second image using the extracted time reference values,
wherein in said synchronizing the first image and the second image using the extracted time reference values, at least one of time stamps of the first image and the second image is corrected according to the extracted time reference values.

12. An apparatus for synchronizing a stereoscopic image, comprising:
a memory for storing a first image;
a receiver for receiving a second image that forms a stereoscopic image with the first image; and
a synchronization controller for synchronizing the stored first image and the received second image,
wherein at least one of the first image and the second image is a digital broadcasting program,
wherein the memory stores the first image before a time of broadcasting the digital broadcasting program, and
wherein the receiver receives the second image at the time of broadcasting the digital broadcasting program according to a broadcasting schedule,
wherein the synchronization controller includes:
a time reference value extractor for extracting time reference values of the first image and the second image, and
a synchronizer for synchronizing the first image and the second image using the extracted time reference values,
wherein the synchronizer corrects at least one of time stamps of the first image and the second image according to the extracted time reference values.

* * * * *